US012752800B2

(12) United States Patent
Kim et al.

(10) Patent No.: US 12,752,800 B2
(45) Date of Patent: Oct. 6, 2026

(54) METHOD AND APPARATUS FOR DETECTING ANOMALY IN LANE FOLLOWING ASSISTANCE SYSTEM

(71) Applicant: HL MANDO CORPORATION, Gyeonggi-do (KR)

(72) Inventors: Manki Kim, Gyeonggi-do (KR); Jaegyu Lee, Gyeonggi-do (KR); Yonghyun Cho, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 25 days.

(21) Appl. No.: 18/829,280

(22) Filed: Sep. 9, 2024

(65) Prior Publication Data

US 2025/0100564 A1 Mar. 27, 2025

(30) Foreign Application Priority Data

Sep. 27, 2023 (KR) ........................ 10-2023-0130783

(51) Int. Cl.
*B60W 50/02* (2012.01)
*B60W 30/12* (2020.01)
*G06V 20/56* (2022.01)

(52) U.S. Cl.
CPC ........ *B60W 50/0205* (2013.01); *B60W 30/12* (2013.01); *G06V 20/588* (2022.01); *B60W 2050/021* (2013.01); *B60W 2540/18* (2013.01)

(58) Field of Classification Search
CPC ............. B60W 50/0205; B60W 30/12; B60W 2050/021; B60W 2540/18; B60W 2552/53; B60W 50/14; B60W 2420/403; B60W 2510/20; G06V 20/588; G06V 20/58; B60Y 2300/12; B60Y 2306/15
See application file for complete search history.

(56) References Cited

U.S. PATENT DOCUMENTS 8,494,716 B1 * 7/2013 Lee ...................... G05D 1/0246 701/41
11,091,143 B2 * 8/2021 Ryu ...................... B60W 30/12
(Continued)

FOREIGN PATENT DOCUMENTS

CN 113071509 B * 5/2022 ........ B60W 50/0205
CN 113562066 B * 9/2022 ......... B62D 15/0215

OTHER PUBLICATIONS

Computer Vision Based Novel Steering Angle Calculation for Autonomous Vehicles (Year: 2018).*
(Continued)

*Primary Examiner* — Fadey S. Jabr
*Assistant Examiner* — Faris Asim Shaikh
(74) *Attorney, Agent, or Firm* — WOMBLE BOND DICKINSON (US) LLP

(57) ABSTRACT

A method and apparatus for detecting an anomaly in a lane following assistance system perform one or more operations including identifying, by an electronic apparatus, a first steering angle based on image data about the front of a running vehicle; identifying, by the electronic apparatus, a second steering angle based on sensing data obtained by a steering sensor provided in the vehicle; and performing, by the electronic apparatus, anomaly detection in a lane following assistance system using the first steering angle and the second steering angle.

14 Claims, 5 Drawing Sheets

(56) References Cited

U.S. PATENT DOCUMENTS

| | | | | |
|---|---|---|---|---|
| 11,685,440 | B2 * | 6/2023 | Varunjikar | G01S 13/931 701/41 |
| 2012/0221171 | A1 * | 8/2012 | Shirakata | G08B 21/06 701/1 |
| 2013/0304326 | A1 * | 11/2013 | Van Dongen | B60W 30/146 701/1 |
| 2015/0070159 | A1 * | 3/2015 | Okuda | B60W 40/08 340/439 |
| 2016/0236712 | A1 * | 8/2016 | Shirakata | B62D 15/029 |
| 2016/0250968 | A1 * | 9/2016 | Shirakata | B60K 28/066 340/576 |
| 2018/0304922 | A1 * | 10/2018 | Hirate | B62D 5/008 |
| 2019/0168807 | A1 * | 6/2019 | Polmans | B62D 5/0484 |
| 2019/0299982 | A1 * | 10/2019 | Guechai | B60W 10/20 |
| 2019/0351941 | A1 * | 11/2019 | Uematsu | B62D 6/02 |
| 2020/0247469 | A1 * | 8/2020 | Kim | B62D 5/0481 |
| 2020/0377150 | A1 * | 12/2020 | Hidaka | B62D 5/0484 |
| 2022/0065653 | A1 * | 3/2022 | Kim | G01S 13/931 |
| 2022/0105983 | A1 * | 4/2022 | Omikawa | B62D 15/025 |
| 2022/0111834 | A1 * | 4/2022 | Yang | B60W 30/143 |
| 2023/0136713 | A1 * | 5/2023 | Kimura | G01L 17/00 701/31.4 |
| 2023/0234573 | A1 * | 7/2023 | Iwase | B60W 30/0956 701/26 |
| 2023/0419105 | A1 * | 12/2023 | Raichelgauz | G06N 3/08 |
| 2024/0017722 | A1 * | 1/2024 | Tanaka | B60W 10/20 |

OTHER PUBLICATIONS

Fault Diagnosis and Fault-Tolerant Compensation Strategy for Wheel Angle Sensor of Steer-by-Wire Vehicle via Extended Kalman Filter (Year: 2022).*

Model Fusion: Weighted N-Version Programming for Resilient Autonomous Vehicle Steering Control (Year: 2018).*

Steering Control and Kalman Filter Position Estimation Comparison for an Autonomous Underwater Vehicle (Year: 2021).*

Translation of CN113071509B retrieved from Espacenet on Mar. 13, 2026 (Year: 2026).*

Translation of CN113562066B retrieved from Espacenet on Mar. 13, 2026 (Year: 2026).*

* cited by examiner

METHOD AND APPARATUS FOR DETECTING ANOMALY IN LANE FOLLOWING ASSISTANCE SYSTEM

CROSS-REFERENCE TO RELATED APPLICATION

This application claims priority to and the benefit from Korean Patent Application No. 10-2023-0130783, filed on Sep. 27, 2023, the disclosure of which is incorporated herein by reference in its entirety.

TECHNICAL FIELD

The present disclosure generally relates to a method and apparatus for detecting an anomaly in a lane following assistance system.

BACKGROUND

In recent years, research has been actively conducted on vehicles equipped with an advanced driver assistance system (ADAS) that actively provides information on vehicle condition, driver condition, and surrounding environment to alleviate the driver's burden and enhance convenience.

Among these advanced driver assistance systems, lane following assistance (LFA) and lane keeping assistance (LKA) that also apply to autonomous vehicles are functions that help drivers drive more safely.

In this case, the lane following assistance system refers to a driving convenience system that controls steering so that the vehicle can drive while maintaining the center of the road. However, if there is an anomaly in the function of the lane following assistance system, the vehicle cannot accurately maintain the center of the lane and the vehicle shakes left/right, causing inconvenience such as motion sickness.

In this way, when an inconvenience occurs due to an anomaly in the lane following assistance system while driving, the driver visits the repair shop and solves the problem by using methods such as calibration of the front camera, wheel alignment, and air pressure check. However, until now, it is common to visit the repair shop only after the driver experiences inconvenience because it does not provide guidance on the timing of maintenance of the lane following assistance system.

SUMMARY

In order to solve such a conventional problem, some embodiments of the present disclosure are directed to providing a method and apparatus for detecting an anomaly in a lane following assistance system capable of providing a maintenance alarm before the user experiences inconvenience caused by an anomaly in the lane following assistance system by checking whether the lane following assistance system is abnormal by using a steering angle estimated from the image data of the front of the running vehicle and an actually measured steering angle.

A method for detecting an anomaly in a lane following assistance system according to an embodiment of the present disclosure includes identifying, by an electronic apparatus, a first steering angle based on image data about the front of a running vehicle; identifying, by the electronic apparatus, a second steering angle based on sensing data obtained by a steering sensor provided in the vehicle; and performing, by the electronic apparatus, anomaly detection in a lane following assistance system using the first steering angle and the second steering angle.

In addition, the performing anomaly detection in a lane following assistance system may include checking whether a road on which the vehicle is traveling is straight based on the image data.

In addition, after the checking whether a road is straight, the method may further include checking, by the electronic apparatus, a residual between the first steering angle and the second steering angle during a first critical time if the road on which the vehicle is traveling is a straight road.

In addition, after the checking whether a road is straight, the method may further include checking, by the electronic apparatus, a residual between the first steering angle and the second steering angle during a second critical time if the road on which the vehicle is traveling is a curved road.

In addition, the performing anomaly detection in a lane following assistance system may include calculating an RMSE value using the residual between the first steering angle and the second steering angle.

In addition, the performing anomaly detection in a lane following assistance system may be a step of determining that an anomaly has occurred in the lane following assistance system if the RMSE value exceeds a threshold.

In addition, after the performing anomaly detection in a lane following assistance system, the method may further include displaying, by the electronic apparatus, a message indicating that an anomaly has occurred in the lane following assistance system.

In addition, the identifying a first steering angle may include estimating a steering angle through analysis of the image data using a deep learning algorithm; generating a steering control signal to control steering of the vehicle through analysis of the image data; performing linear interpolation of the steering angle based on the steering control signal; and generating the first steering angle by comparing the linearly interpolated value and the steering control signal.

In addition, the calculating an RMSE value may include generating a graph of the first steering angle and the second steering angle identified during a first critical time or second critical time depending on whether the road is straight; dividing the critical time into at least one section based on a position where values for the first steering angle and the second steering angle intersect; and determining a largest difference value among difference values identified within the at least one section as the residual of the corresponding section.

In addition, the second critical time may be longer than the first critical time.

Furthermore, an electronic apparatus for detecting an anomaly in a lane following assistance system according to an embodiment of the present disclosure includes a camera configured to obtain image data about the front of a running vehicle; and a controller configured to identify a first steering angle based on the image data, identify a second steering angle based on sensing data obtained by a steering sensor provided in the vehicle, and perform anomaly detection in a lane following assistance system by using the first steering angle and the second steering angle.

In addition, the controller may be configured to check whether a road on which the vehicle is traveling is straight based on the image data.

In addition, the controller may be configured to check a residual between the first steering angle and the second steering angle during a first critical time if the road on which the vehicle is traveling is a straight road.

In addition, the controller may be configured to check a residual between the first steering angle and the second steering angle during a second critical time if the road on which the vehicle is traveling is a curved road.

In addition, the controller may be configured to calculate an RMSE value using the residual between the first steering angle and the second steering angle.

In addition, the controller may be configured to determine that an anomaly has occurred in the lane following assistance system if the RMSE value exceeds a threshold.

In addition, the electronic apparatus may further include a display, and the controller may be configured to display a message indicating that an anomaly has occurred in the lane following assistance system by using the display.

In addition, the controller may be configured to perform linear interpolation of the steering angle based on a steering angle estimated through analysis of the image data using a deep learning algorithm and a steering control signal generated to control the steering of a vehicle, and generate the first steering angle by comparing the linearly interpolated value and the steering control signal.

In addition, the controller may be configured to generate a graph of the first steering angle and the second steering angle identified during a first critical time or second critical time depending on whether the road is straight, divide the critical time into at least one section based on a position where values for the first steering angle and the second steering angle intersect, and determine a largest difference value among difference values identified within the at least one section as the residual of the corresponding section.

In addition, the second critical time may be longer than the first critical time.

As described above, the method and apparatus for detecting an anomaly in a lane following assistance system according to an embodiment of the present disclosure may provide a maintenance alarm before the user experiences inconvenience caused by an anomaly in the lane following assistance system by checking whether the lane following assistance system is abnormal by using the steering angle estimated from the image data of the front of the running vehicle and the actual measured steering angle.

DETAILED DESCRIPTION OF THE EMBODIMENTS

Figure 1:
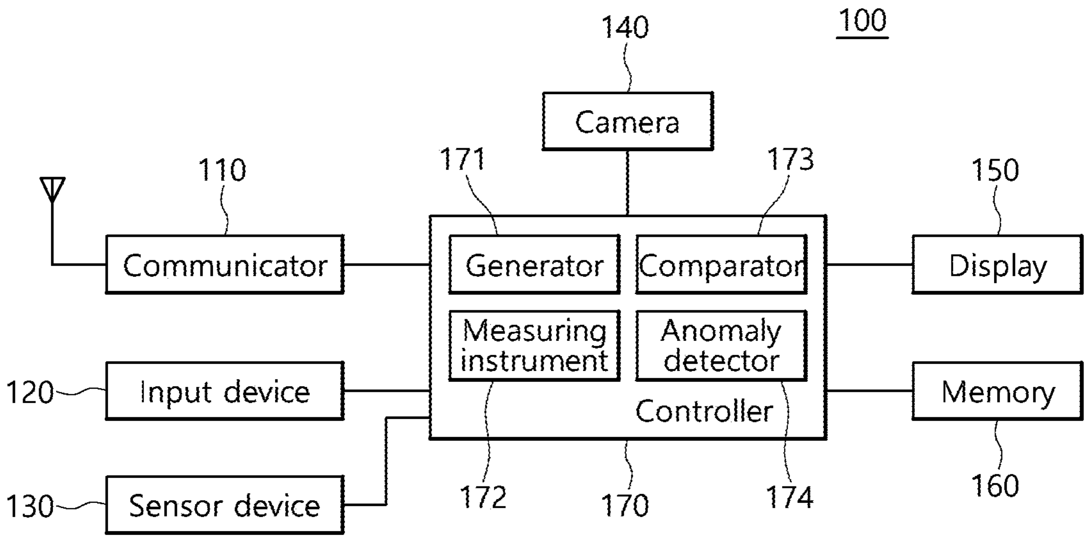
FIG. 1 is a diagram showing the main configuration of an electronic apparatus configured to detect anomalies in a lane following assistance system according to an embodiment of the present disclosure.

Hereinafter, preferred embodiments according to the present disclosure will be described in detail with reference to the accompanying drawings. The detailed description to be disclosed hereinafter with the accompanying drawings is intended to describe exemplary embodiments of the present disclosure and is not intended to represent the only embodiments in which the present disclosure may be implemented. In the drawings, parts unrelated to the description may be omitted for clarity of description of the present disclosure, and like reference numerals may designate like elements throughout the specification.

FIG. 1 is a diagram showing the main configuration of an electronic apparatus configured to detect anomalies in a lane following assistance system according to an embodiment of the present disclosure.

Referring to FIG. 1, the electronic apparatus 100 according to an embodiment of the present disclosure may include a communicator 110, an input device 120, a sensor device 130, a camera 140, a display 150, a memory 160, and a controller 170.

The communicator 110 may receive or provide sensing data obtained by the sensor device 130 and image data obtained by the camera 140 to the controller 170 through communication with the sensor device 130 and the camera 140. To this end, the communicator 110 may perform communication such as CAN (controller area network), NFC (near field communication), Zigbee, and the like, and may perform serial communication such as RS-232.

The input device 120 generates input data in response to input from a user or driver of the vehicle. To this end, the input device 120 may include a key pad, a dome switch, a touch panel, a touch key, a button, and the like.

The sensor device 130 may include a steering sensor for sensing a steering angle. Based on this, the sensor device 130 may obtain the steering angle that is actually confirmed when the vehicle is traveling and provide it to the controller 170. To this end, the sensor device 130 may perform wireless communication such as Bluetooth, Bluetooth low energy (BLE), near field communication (NFC), Zigbee, and the like with the controller 170, and may perform serial communication such as RS-232.

The camera 140 is included or provided in the vehicle and generates image data about the environment outside the vehicle. In particular, the camera 140 may generate image data about the front of the running vehicle and provide it to the controller 170.

The display 150 displays display data related to an operation performed in the electronic apparatus 100. The display 150 includes, for instance, but not limited to, a liquid crystal display (LCD), a light emitting diode (LED) display, an organic light emitting diode (OLED) display, a micro electro mechanical systems (MEMS) display, and an electronic paper display. The display 150 may be integrated or combined with the input device 120 to be implemented as, for example, a touch screen capable of input.

The memory 160 stores an operation program for operation of the electronic apparatus 100. In particular, the memory 160 may store a deep learning algorithm for checking the first steering angle by analyzing image data about the front of the running vehicle. In addition, the memory 160 may calculate a residual by comparing the first steering angle with the second steering angle included in the sensing data obtained by the sensor device 130, and store an algorithm for calculating a root-mean-square error (RMSE) value of the calculated residual. The memory 160 may store a threshold value that serves as a standard for detecting anomalies in the lane following assistance system.

The controller 170 checks the first steering angle based on image data of the front of the running vehicle, checks the second steering angle based on sensor data or sensing data obtained from the steering sensor among sensors included in the sensor device 130, and performs anomaly detection in the lane following assistance system using the first steering angle and the second steering angle. To this end, the controller 170 may include a generator 171, a measuring instrument 172, a comparator 173, and an anomaly detector 174.

The generator 171 may generate a steering control signal for substantially controlling the steering angle of the vehicle by checking the lane marked on the road on which the vehicle is traveling through analysis of the image data of the running vehicle obtained by the camera 140. In addition, the generator 171 executes a deep learning algorithm stored in the memory 160 and applies the image data of the running vehicle acquired by the camera 140 to the deep learning algorithm. The generator 171 may estimate a steering angle corresponding to a lane marked on a driving road through image data analysis using the deep learning algorithm. The deep learning algorithm may be, for example, but not limited to, Pilot-Net, FOLOLane (focus on local lane), CLRNet (cross layer refinement network), LaneNet, and RFSA (recurrent feature-shift aggregator).

The generator 171 performs linear interpolation on the estimated steering angle according to the generated steering control signal. For example, if a period for estimating the steering angle using image data is 50 ms and a period for generating the steering control signal is 10 ms, the generator 171 may perform linear interpolation on the estimated steering angle according to the period in which the steering control signal is obtained. To this end, the generator 171 may check a value corresponding to the steering control signal.

The generator 171 compares the linearly interpolated value with the generated steering control signal. The generator 171 generates the first steering angle based on the comparison results between the linearly interpolated value and the generated steering control signal. For example, the generator 171 may generate the first steering angle by calculating the intermediate value of the residual between the linearly interpolated value and the value of the steering control signal.

In addition, the generator 171 may check whether the road on which the vehicle is traveling is a straight road according to the analysis results of the image data and provide the information to the comparator 173.

The measuring instrument 172 checks the second steering angle based on the sensor data or sensing data obtained by the sensor device 130.

The comparator 173 compares the first steering angle and the second steering angle. More specifically, the comparator 173 checks whether the road being driven provided by the generator 171 is straight. If the road on which the driver is traveling is a straight road, the comparator 173 checks the residual between the first steering angle and the second steering angle during the first reference time or the first critical time. Conversely, if the road on which the driver is traveling is a curved road, the comparator 173 checks the residual between the first steering angle and the second steering angle during the second reference time or the second critical time. For instance, the first reference time or the first critical time may be 20 seconds and the second reference time or the second critical time may be 30 seconds.

The comparator 173 calculates a root-mean-square error (RMSE) value of the residual. More specifically, the comparator 173 may generate a data table or a graph of changes in the first steering angle and the second steering angle during the first reference/critical time or second reference/critical time. The comparator 173 may divide the reference/critical time traveled by the vehicle into at least two sections based on one or more points or positions where the graphs for the first steering angle and the second steering angle, or a value of the first steering angle and a value of the second steering angle, intersect. The comparator 173 may determine the largest difference value among the difference values between the first steering angle and the second steering angle within each section as the residual of the corresponding section, and calculate the RMSE value using the residual identified for each section.

If the calculated RMSE value exceeds the threshold, the anomaly detector 174 may determine that an anomaly has been detected in the lane following assistance system, generate a message for notifying the detection of the anomaly, and then display the message on the display 150. Conversely, if the calculated RMSE value is less than or equal to the threshold, the anomaly detector 174 may determine that no anomaly is detected in the lane following assistance system and check in real time or periodically whether an anomaly in the lane following assistance system is detected until the vehicle's traveling or operation is terminated.

Figure 2:
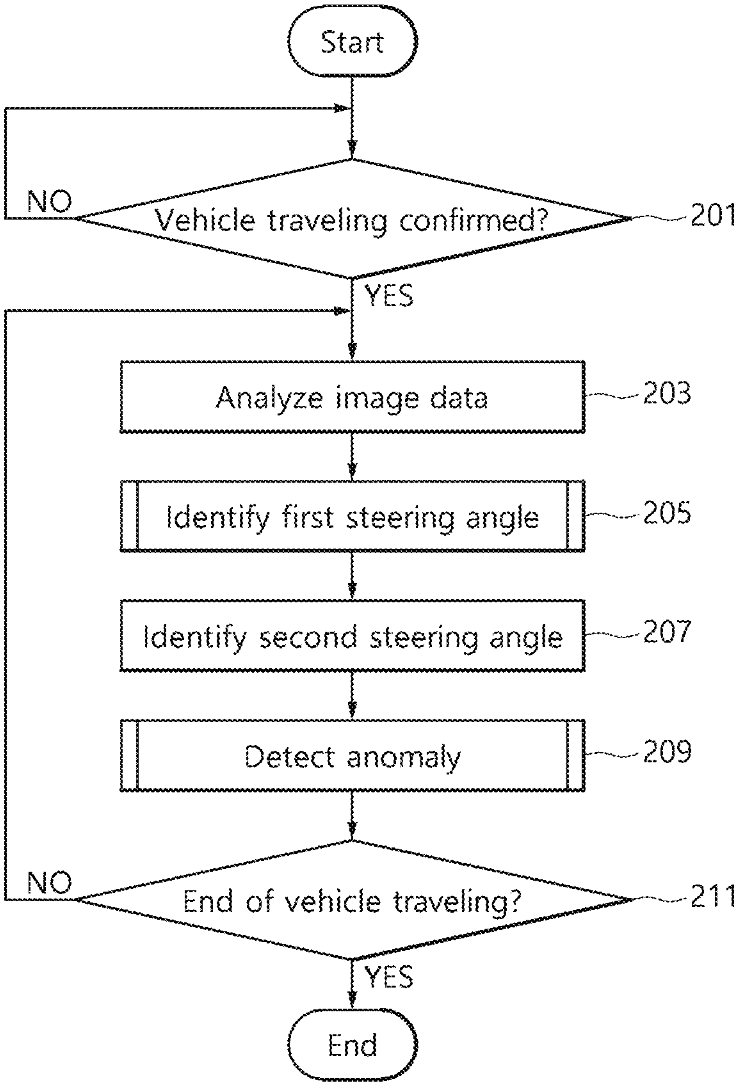
FIG. 2 is a flowchart for describing a method for detecting an anomaly in a lane following assistance system according to an embodiment of the present disclosure.

FIG. 2 is a flowchart for describing a method for detecting an anomaly in a lane following assistance system according to an embodiment of the present disclosure.

Referring to FIG. 2, in step 201, the controller 170 checks whether the vehicle is traveling. If it is determined the vehicle is traveling as a result of checking in step 201, the controller 170 performs step 203, and if it is determined that the vehicle is not traveling as a result of checking in step 201, it continuously checks whether the vehicle is traveling.

In step 203, the controller 170 analyzes image data obtained from the camera 140. In this case, the image data may be image data about the road ahead of the vehicle being driven or image date in from of the vehicle.

Figure 3:
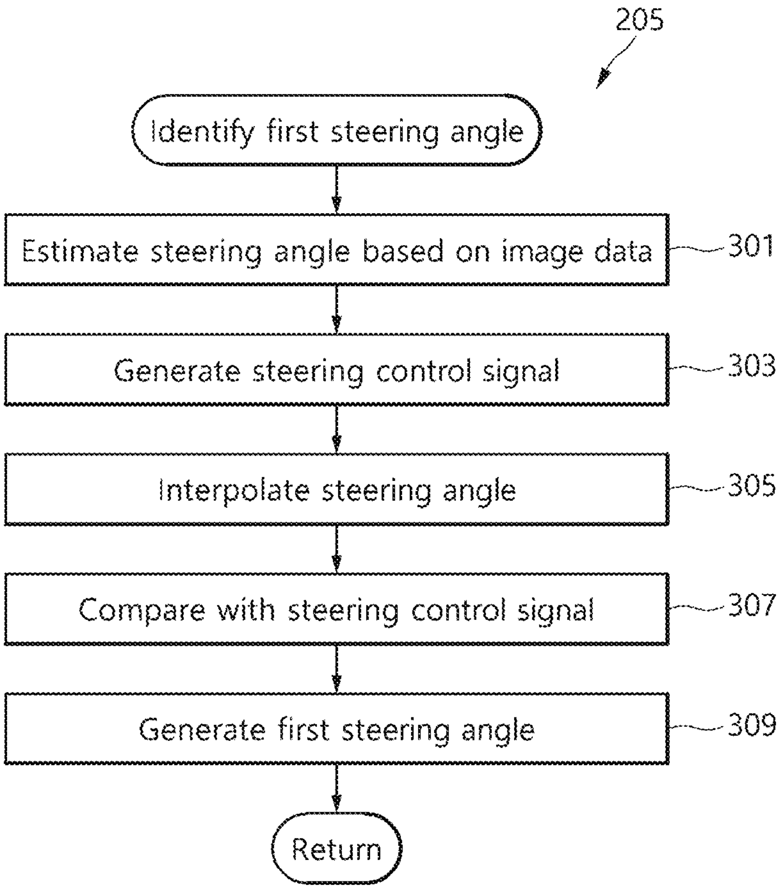
FIG. 3 is a detailed flowchart for describing a method for checking a first steering angle through image data analysis according to an embodiment of the present disclosure.

In step 205, the controller 170 identifies a first steering angle through analysis of the image data. This will be described in more detail with reference to FIG. 3 below. FIG. 3 is a detailed flowchart for describing a method for checking a first steering angle through image data analysis according to an embodiment of the present disclosure.

Referring to FIG. 3, in step 301, the controller 170 may estimate a steering angle corresponding to a lane marked on a road by analyzing the image data by applying the image data to a deep learning algorithm. In step 303, the controller 170 may generate a steering control signal for substantially controlling the steering angle of the vehicle by checking the lanes marked on the road. The deep learning algorithm may be, for example, but not limited to, Pilot-Net, FOLOLane (focus on local lane), CLRNet (cross layer refinement network), LaneNet, and RFSA (recurrent feature-shift aggregator).

In step 305, the controller 170 performs linear interpolation on the steering angle estimated in step 301 in accordance with the steering control signal generated in step 303. For example, if a period for estimating the steering angle using image data is 50 ms and a period for generating the steering control signal is 10 ms, the controller 170 may perform linear interpolation on the estimated steering angle according to the period in which the steering control signal is obtained. To this end, the controller 170 may check a value corresponding to the steering control signal.

In step 307, the controller 170 compares the linearly interpolated value with the steering control signal generated in step 303. In step 309, the controller 170 generates a first steering angle based on the comparison result in step 307 and returns to step 207 of FIG. 2. For example, the controller 170 may generate the first steering angle by calculating the intermediate value of the residual between the linearly interpolated value and the value of the steering control signal.

In step 207, the controller 170 may check the second steering angle based on the sensor data or sensing data obtained by the sensor device 130. In this case, the sensor device 130 may include a steering sensor for sensing a steering angle, and the sensor data or sensing data may be sensor data sensing data for the steering angle.

Figure 4:
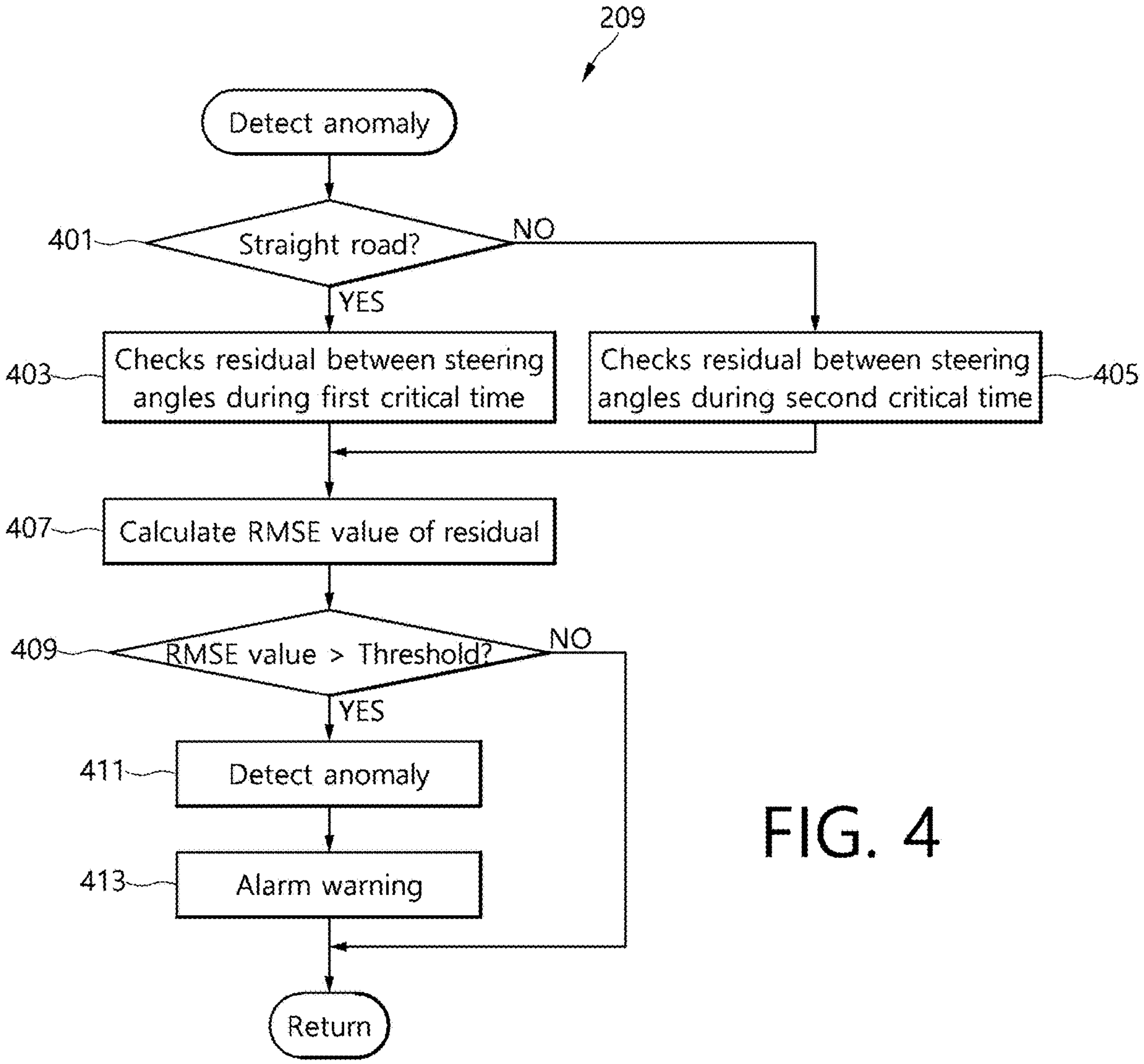
FIG. 4 is a detailed flowchart for describing a method for detecting an anomaly in a lane following assistance system using a steering angle according to an embodiment of the present disclosure.

In step 209, the controller 170 detects whether the lane following assistance system is abnormal using the first steering angle and the second steering angle. This will be described in more detail with reference to FIG. 4 below. FIG. 4 is a detailed flowchart for describing a method for detecting an anomaly in a lane following assistance system using a steering angle according to an embodiment of the present disclosure.

Referring to FIG. 4, in step 401, the controller 170 checks whether a road on which the vehicle is traveling is a straight road. In this case, the controller 170 may check whether the road on which the vehicle is traveling is a straight road by using the lane identified in the image data. As a result of checking in step 401, if the road being driven is a straight road, the controller 170 performs step 403, and if the road being driven is a curved road, performs step 405.

If the road being driven is a straight road, in step 403, the controller 170 checks the residual of the first steering angle and the second steering angle during the first reference/critical time and performs step 407. Conversely, if the road being driven is a curved road, in step 405, the controller 170 checks the residual of the first steering angle and the second steering angle during the second reference/critical time and performs step 407. For instance, the first critical time may be 20 seconds and the second critical time may be 30 seconds.

In step 407, the controller 170 calculates a root-mean-square error (RMSE) value of the residual. More specifically, the controller 170 may generate a data table or a graph of changes in the first steering angle and the second steering angle during the first reference/critical time or second reference/critical time. The controller 170 may divide the critical time traveled by the vehicle into at least two sections based on one or more points or positions where the graphs for the first steering angle and the second steering angle, or a value of the first steering angle and a value of the second steering angle, intersect. The controller 170 may determine the largest difference value among the difference values between the first steering angle and the second steering angle within each section as the residual of the corresponding section, and calculate the RMSE value using the residual identified for each section.

In step 409, the controller 170 performs step 411 if the RMSE value of the residual exceeds the threshold, and returns to step 211 of FIG. 2 if the RMSE value of the residual is less than or equal to the threshold. In step 409, if the RMSE value of the residual exceeds the threshold, in step 411, the controller 170 determines that an anomaly has been detected in the lane following assistance system and performs step 413. In step 413, the controller 170 generates a message for notifying that an anomaly has been detected in the lane following assistance system, displays the anomaly notification message on the display 150, and returns to step 211 of FIG. 2.

In step 211, if the end of the traveling of the vehicle is confirmed, the controller 170 terminates the corresponding process, and if the end of the traveling is not confirmed, the controller 170 may return to step 203 to perform steps 203 to 209 again. Through this, some embodiments of the present disclosure may provide a maintenance alarm before the user experiences inconvenience caused by an anomaly in the lane following assistance system by checking whether the lane following assistance system is abnormal by using the steering angle estimated from the image data in front of the running vehicle and the actually measured steering angle.

Figure 5:
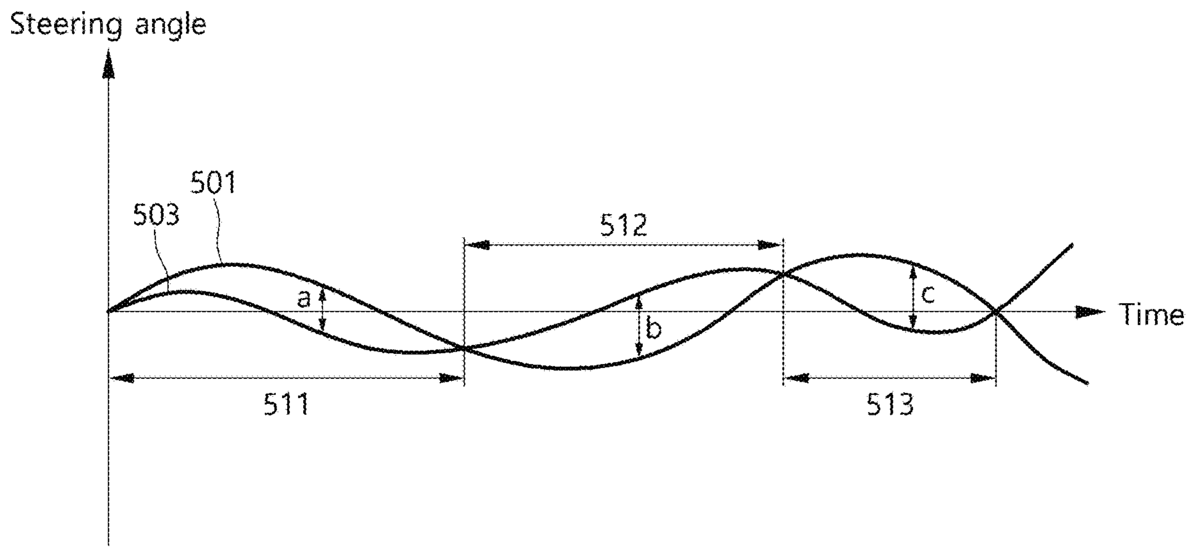
FIG. 5 is a graph for describing a method for detecting an anomaly in a lane following assistance system according to an embodiment of the present disclosure.

FIG. 5 is a graph for describing a method for detecting an anomaly in a lane following assistance system according to an embodiment of the present disclosure.

Referring to FIG. 5, the controller 170 checks a graph for the first steering angle 501 identified based on the image data and the second steering angle 503 identified from the sensor data or sensing data obtained by the sensor device 130. In the graph, the x-axis may represent time and the y-axis may represent a steering angle. For example, FIG. 5 may be a graph of the first steering angle and the second steering angle identified during a first reference/critical time, for example, 20 seconds, while the vehicle is traveling on a straight road.

The controller 170 calculates residuals from the two graphs. The controller 170 sets the graph for the two steering angles to a first section 511 that touches after (0, 0), a second section 512 that touches after the first section 511, and a third section 513 that touches after the second section 512, and calculates the residual in each section. In this case, the controller 170 may calculate the residual having the largest value among the residuals identified in each section as a first residual a, a second residual b, and a third residual c.

The controller 170 calculates a root-mean-square error (RMSE) value of the first residual a, the second residual b, and the third residual c. If at least one of the RMSE values for the three residuals is a threshold, for example, 2 or more, the controller 170 may determine that an anomaly is detected in the lane following assistance system. In addition, the threshold, which is the criterion for detecting an anomaly in the lane following assistance system, can be changed and applied.

The embodiments of the present disclosure disclosed in the present specification and drawings are only provided as specific examples to easily describe the technical content of the present disclosure and to aid understanding of the present disclosure, and are not intended to limit the scope of the present disclosure. Therefore, the scope of the present disclosure should be construed that all changes or modifications derived based on the technical idea of the present disclosure in addition to the embodiments disclosed herein are included in the scope of the present disclosure.

What is claimed is:

1. A method for detecting an anomaly in a lane following assistance system, comprising:
   - identifying a first steering angle based on image data in front of a vehicle, the identifying of the first steering angle comprises at least:
     - generating a steering control signal based on an analysis of the image data;
     - controlling a steering of the vehicle using the steering control signal; and
     - generating the first steering angle based on the steering control signal;
   - identifying a second steering angle based on sensor data generated by a steering sensor of the vehicle; and
   - detecting an anomaly in a lane following assistance system using the first steering angle, identified based on the image data in front of the vehicle, and the second steering angle, identified based on the sensor data generated by the steering sensor, wherein the detecting of the anomaly in the lane following assistance system comprises:

determining that the vehicle is traveling on a straight road based on the image data in front of the vehicle;

in response to determining that the vehicle is traveling on the straight road, calculating a root-mean-square error (RMSE) value using a residual between the first steering angle, identified based on the image data in front of the vehicle, and the second steering angle, identified based on the sensor data generated by the steering sensor; and determining that the anomaly has occurred in the lane following assistance system if the RMSE value exceeds a threshold and performing a control operation of the vehicle based on the determining that the anomaly has occurred.

2. The method according to claim 1, further comprising, if the vehicle is traveling on the straight road, checking a residual between the first steering angle, identified based on the image data in front of the vehicle, and the second steering angle, identified based on the sensor data generated by the steering sensor, during a first reference time.

3. The method for detecting an anomaly in a lane following assistance system according to claim 1, further comprising, if the vehicle is traveling on a curved road, checking a residual between the first steering angle, identified based on the image data in front of the vehicle, and the second steering angle, identified based on the sensor data generated by the steering sensor, during a second reference time.

4. The method according to claim 1, further comprising, in response to detection of the anomaly in the lane following assistance system, outputting a message indicating that the anomaly has occurred in the lane following assistance system.

5. The method according to claim 1, wherein the identifying of the first steering angle based on the image data in front of the vehicle comprises:

estimating, before generating the steering control signal, a steering angle by performing the analysis of the image data using a deep learning algorithm;

performing linear interpolation of the estimated steering angle based on the steering control signal; and generating the first steering angle by comparing a linearly interpolated value, calculated by performing the linear interpolation of the estimated steering angle, with the steering control signal.

6. The method according to claim 1, wherein the calculating of the RMSE value comprises:

tracking the first steering angle and the second steering angle identified during a reference time, wherein the reference time is selected among a first reference time and a second reference time depending on whether the vehicle is traveling on the straight road;

dividing the reference time into at least two sections based on one or more points where the first steering angle and the second steering angle intersect; and determining a largest difference value between the first steering angle and the second steering angle identified within each of the at least two sections as a residual of each of the at least two sections.

7. The method according to claim 6, wherein the second reference time is longer than the first reference time.

8. An electronic apparatus for detecting an anomaly in a lane following assistance system, comprising:

a camera configured to generate image data in front of a vehicle; and a controller configured to identify a first steering angle based on the image data generated by the camera, identify a second steering angle based on sensor data generated by a steering sensor of the vehicle, and detect an anomaly in a lane following assistance system by using the first steering angle, identified based on the image data in front of the vehicle, and the second steering angle, identified based on the sensor data generated by the steering sensor, wherein the identifying of the first steering angle comprises at least, by the controller:

generating a steering control signal based on an analysis of the image data;

controlling a steering of the vehicle using the steering control signal; and generating the first steering angle based on the steering control signal, and wherein the controller is further configured to:

determine that the vehicle is traveling on a straight road based on the image data in front of the vehicle;

in response to determining that the vehicle is traveling on the straight road, calculate a root-mean-square error (RMSE) value using a residual between the first steering angle, identified based on the image data in front of the vehicle, and the second steering angle, identified based on the sensor data generated by the steering sensor; and determine that the anomaly has occurred in the lane following assistance system if the RMSE value exceeds a threshold and perform a control operation of the vehicle based on the determining that the anomaly has occurred.

9. The electronic apparatus according to claim 8, wherein the controller is configured to, if the vehicle is traveling on the straight road, check a residual between the first steering angle, identified based on the image data in front of the vehicle, and the second steering angle, identified based on the sensor data generated by the steering sensor, during a first reference time.

10. The electronic apparatus according to claim 8, wherein the controller is configured to, if the vehicle is traveling on a curved road, check a residual between the first steering angle, identified based on the image data in front of the vehicle, and the second steering angle, identified based on the sensor data generated by the steering sensor, during a second reference time.

11. The electronic apparatus according to claim 1, wherein the controller is configured to, in response to detection of the anomaly in the lane following assistance system, output a message indicating that the anomaly has occurred in the lane following assistance system.

12. The electronic apparatus according to claim 8, wherein the controller is configured to;

perform linear interpolation of a steering angle, estimated using the analysis of the image data using a deep learning algorithm, based on the steering control signal, and generate the first steering angle by comparing a linearly interpolated value, calculated by performing the linear interpolation of the estimated steering angle, with the steering control signal.

13. The electronic apparatus according to claim 8, wherein the controller is configured to:

track the first steering angle and the second steering angle identified during a reference time, wherein the reference time is selected among a first reference time and a second reference time depending on whether the vehicle is traveling on the straight road, divide the reference time into at least two sections based on one or more points where the first steering angle and the second steering angle intersect, and determine a largest difference value between the first steering angle and the second steering angle identified within each of the at least two sections as a residual of each of the at least two sections.

14. The electronic apparatus according to claim 13, wherein the second reference time is longer than the first reference time.

* * * * *